(12) United States Patent
Sentoku et al.

(10) Patent No.: US 7,123,414 B2
(45) Date of Patent: Oct. 17, 2006

(54) METHOD FOR PRODUCING LIBRARY

(75) Inventors: Koichi Sentoku, Tochigi (JP); Hideki Ina, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 10/869,558

(22) Filed: Jun. 16, 2004

(65) Prior Publication Data

US 2005/0004778 A1     Jan. 6, 2005

(30) Foreign Application Priority Data

Jun. 17, 2003   (JP)   .............................. 2003-172628

(51) Int. Cl.
G02B 27/44    (2006.01)
G02B 5/18     (2006.01)

(52) U.S. Cl. ...................... 359/566; 359/569; 356/369; 356/445; 356/601

(58) Field of Classification Search ................ 359/566, 359/569; 702/155; 356/369, 445, 601
See application file for complete search history.

(56) References Cited

U.S. PATENT DOCUMENTS 6,657,736 B1 * 12/2003 Finarov et al. ............. 356/625
6,900,892 B1 * 5/2005 Shchegrov et al. ......... 356/369

FOREIGN PATENT DOCUMENTS

| JP | 9-36037   | 2/1997 |
| JP | 10-22205  | 1/1998 |
| JP | 11-211421 | 8/1999 |
| JP | 11-211422 | 8/1999 |

OTHER PUBLICATIONS

Taiwan Office Action dated Sep. 12, 2005.
Koean Office Action and its English translation thereof.
Taiwanese Office Action and its English translation thereof.

* cited by examiner

Primary Examiner—Leonidas Boutsikaris
(74) Attorney, Agent, or Firm—Morgan & Finnegan, L.L.P.

(57) ABSTRACT

A method for producing a library includes the steps of calculating a plurality of conditions for a reflection light from a periodic pattern by changing the sectional shape of the periodic pattern, a condition of an incident light which is emitted to the periodic pattern, an optical constant of a material which forms the periodic pattern, relating a plurality of the libraries to the plurality of the reflection light's conditions, and the optical constant corresponding to the plurality of the reflection light's conditions respectively.

9 Claims, 8 Drawing Sheets

METHOD FOR PRODUCING LIBRARY

This application claims priority benefit under 35 U.S.C. §119 based on Japanese Patent Application No. 2003-172628 filed on Jun. 17, 2003, which is hereby incorporated by reference herein in its entirety as if fully set forth herein.

BACKGROUND OF THE INVENTION

The present invention generally relates to library producing methods used in measuring sectional shapes of patterns that have periodic uneven structure by using light, and more concretely to library producing methods used in measuring sectional shapes of fine periodic patterns (such as line & space patterns) formed on wafers that are used for device fabricating processes, wherein the devices (for example, semiconductor devices such as ICs or LSIs, imaging devices such as CCDs, display devices such as liquid crystal panels, or detecting devices such as magnetic heads) are fabricated by exposing wafers as photosensitive substrates.

Along with recent demands for higher integration of semiconductor devices such as ICs or LSIs, fine processing technology for semiconductor devices has been greatly improved. As exposure apparatuses to which the fine processing technology is applied, many kinds of reduction projection exposure apparatuses (steppers) are proposed that form an image of a circuit pattern on a mask (reticle) as an original exposure form to a wafer as a photosensitive substrate, and exposing the photosensitive substrate by a step-and-repeat method.

Generally, it is important to decide exposure conditions such as the exposure dose on a wafer or the focusing position (position along the optical axis of the projection optical system) of the wafer appropriately in exposing a fine circuit pattern by using a stepper that has a projection optical system. Therefore, a conventional exposure apparatus decides an optimum exposure condition by developing the photosensitive substrate (wafer) and by measuring the critical dimension of the circuit pattern on the wafer by using a light microscope or a critical dimension measuring apparatus after exposing the pattern onto the wafer by changing the exposure condition (i.e., at least each one of the exposure doses (shutter opening time) or a focus position) per 1 shot, each in a test exposure process (send ahead process) before the mass production process.

For example, the shot area (the exposure area) is exposed with its focus maintained as a constant and its exposure dose (shutter opening time) changed constantly per 1 shot in a crosswise arrangement, with its exposure dose maintained as a constant, and its focus changed constantly per 1 shot in a lengthwise arrangement. Then, the critical dimension of the line and space resist pattern (hereinafter called the L&S pattern) formed in each shot is measured by using a scanning electron microscope (SEM) after developing, the optimum focus position, and the optimum exposure dose of the projection lens is calculated.

Another method besides measuring the critical dimension by SEM is proposed in references 1 and 2. The method disclosed in these references shows the emission of polarized lights (the S polarized light and the P polarized light) onto a periodic pattern in order to measure the critical dimension. The disclosed method also shows the measure of a reflected light's conditions (intensity and phase) from the periodic pattern, detection of the change of the polarized light's conditions reflecting on the periodic pattern, and the calculation of the critical dimension of the periodic pattern in accordance with the change.

In references 3 and 4, inventors of the present invention proposed a method for obtaining the optimum focus position and the optimum exposure dose of the exposure apparatus in an exposing process by emitting the polarized light (the S polarized light and the P polarized light) to the periodic pattern, and measuring the critical dimension of the periodic pattern exposed onto the wafer in accordance with the conditions (intensity and phase) of the reflection light from the periodic pattern.

Sectional shape measuring apparatuses manufactured by several measurement hardware manufacturers (Accent Optical Technologies Corp., KLA—Tencor Corp., Nanometrics Corp., Nova Measuring Instruments Corp., Therma—Wave Corp., and Timbre Technologies Corp.) can measure the sectional shape of the periodic pattern by emitting the polarized light onto the periodic pattern, and comparing the measured value and calculated value of the condition change (intensity change and phase change) of the light reflected from the periodic pattern. The calculated value of the reflected light's condition change is calculated by using pre-determined periodic pattern shape and the optical constant (for example, a refraction index n or an absorption coefficient k) of the material that forms the periodic pattern as parameters, etc.

Reference 1; Japanese Patent Application Publication No. 11-211421

Reference 2; Japanese Patent Application Publication No. 11-211422

Reference 3; Japanese Patent Application Publication No. 9-36037

Reference 4; Japanese Patent Application Publication No. 10-22205

However, in order to measure and observe the periodic pattern using a SEM, it is necessary to cut the periodic pattern in a specific size as a sample, and to install the sample in a vacuum chamber, which takes much time and effort. In the case that the periodic pattern to be measured is formed by a chemically amplified resist, the measurement of the critical dimension will be inaccurate because the periodic pattern deforms by charging electrons when irradiating the periodic pattern with an electron beam for the measurement.

There is another problem in using the previously explained sectional shape measurement apparatus for measuring the sectional shape of the periodic pattern by emitting the polarized light to the periodic pattern and comparing the measured value and the calculated value of the condition change (intensity change and phase change) of the light reflected from the periodic pattern. The measurement of the critical dimension will be inaccurate when an actual optical constant of the material (the object) which forms the periodic pattern is different from a calculated optical constant of the material which forms the periodic pattern used in calculating the condition change of the reflected light, because of aged deterioration or dispersion among the lots.

BRIEF SUMMARY OF THE INVENTION

Accordingly, it is an exemplary object to provide a method for producing a library used in measuring the sectional shape of a pattern that has a periodic uneven shape (for example, L&S pattern) with high throughput and accuracy, without destroying the pattern or being influenced by the change of the material's optical constant which forms the pattern.

A method for producing a library of one aspect according to the present invention includes the steps for calculating a plurality of conditions for the reflection of light from a periodic pattern by changing the sectional shape of the periodic pattern. The method also involves a condition of an incident light which is emitted to the periodic pattern, an optical constant of a material which forms the periodic pattern, relating a plurality of the libraries to the plurality of the reflection light's conditions and the optical constant corresponding to the plurality of the reflection light's conditions respectively.

In the method for producing a library, the optical constant may be any one of a refraction index, an absorption coefficient, or a thickness of the periodic pattern. The conditions of the reflection light may be the intensity or the phase of the reflected light. The condition of the incident light may be any one of an incident angle, a wavelength, or an intensity of the incident light. The material that forms the periodic pattern may be a resist.

A method for measuring the sectional shape of another aspect according to the present invention includes the steps of measuring the optical constant of a material, which forms a periodic pattern by using a spectroscopic ellipsometer, selecting a library corresponding to the measured optical constant from a plurality of libraries (produced by using the previously explained method), detecting the condition of the reflection light from the periodic pattern by emitting the incident light to the periodic pattern with a specific condition, and obtaining the sectional shape related to the detected reflection light's condition from the selected library.

If there is no library corresponding to the measured optical constant in the plurality of the libraries, a library corresponding to the measured optical constant may be produced by using the plurality of the libraries.

An apparatus for measuring the sectional shape of still another aspect according to the present invention includes a processor for calculating a plurality of conditions of a reflection light from a periodic pattern by changing the sectional shape of the periodic pattern, a condition of the incident light which is emitted onto the periodic pattern, an optical constant of a material which forms the periodic pattern, a storage unit for storing a plurality of libraries that are respectively related to the plurality of the reflection light's conditions and the optical constant corresponding to the plurality of the reflection light's conditions, a light source for emitting the incident light to the periodic pattern in a specific condition, a light sensor for detecting the condition of the reflection light from the periodic pattern, wherein the processor selects the library corresponding to the optical constant of the material which forms the periodic pattern from the storage unit, the optical constant being measured by a spectroscopic ellipsometer, and the processor obtains the sectional shape related to the detected reflection light's condition from the selected library.

An exposure apparatus of still another aspect according to the present invention includes the means for measuring a sectional shape of a periodic pattern by using the method for measuring a sectional shape explained before, and aligning a substrate in accordance with the measured periodic pattern.

A device fabricating method of still another aspect according to the present invention includes the steps of exposing a substrate by using the exposure explained before, and developing the substrate that has been exposed.

Other objects and further features of the present invention will become readily apparent from the following description of the preferred embodiments with reference to accompanying drawings.

DETAILED DESCRIPTION OF THE PREFERRED EMBODIMENTS

[The First Embodiment]

A description will now be given of the principles of a method for measuring a sectional shape of a periodic pattern. The method for measuring the sectional shape of the periodic pattern in this invention is generally called "Spectroscopic Ellipsometry". Spectroscopic Ellipsometry can obtain a sectional shape by emitting a directly polarized light that is formed from the P polarized light and the S polarized light with their phase shift of "0" and their amplitude ratio of "1" to the periodic pattern with a specific incident angle of "θ" or with changing the incident angle, and by measuring the phase shift ($\Delta$) and the amplitude ratio ($\psi$) of the reflected light. The principle of the detection is disclosed in "Principle of Optics (Pergamon Press), M. Born and E. Wolf" or Japanese Patent Application Publication No. 11-211421.

Figure 1:
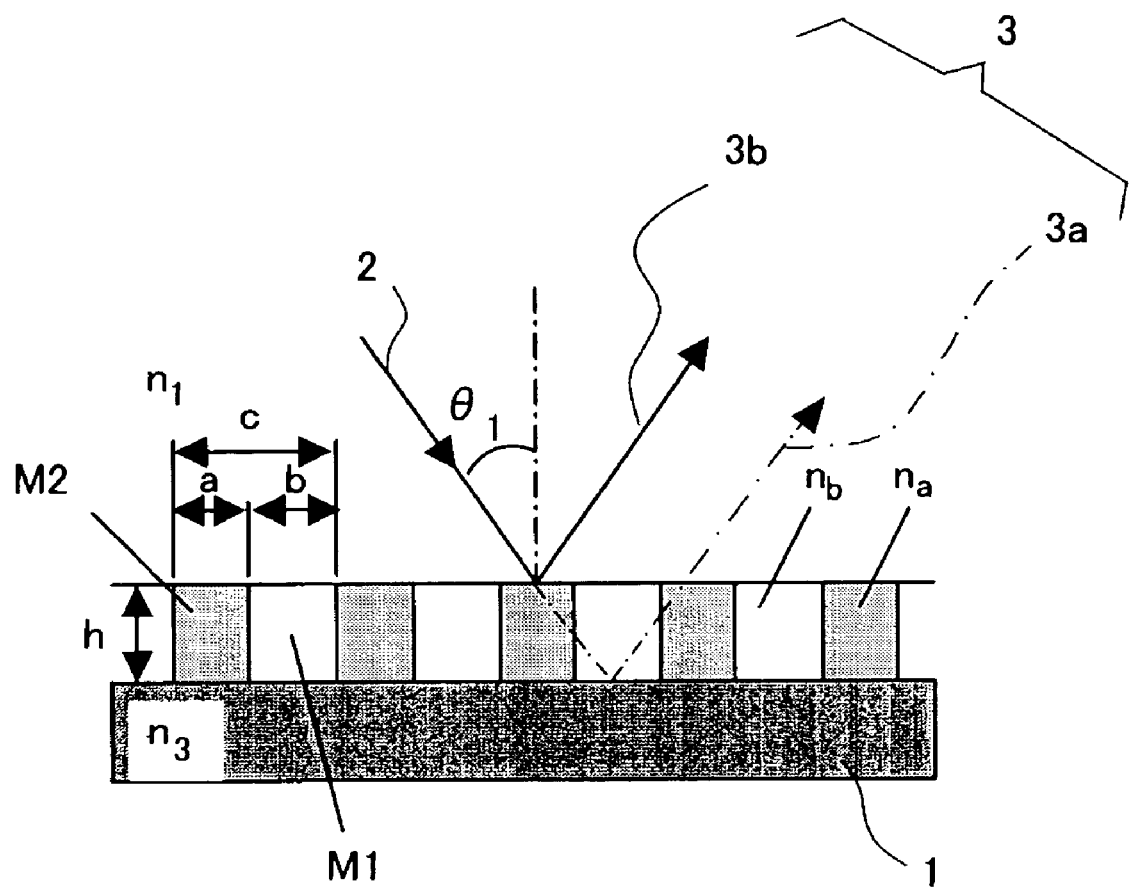
FIG. 1 is a schematic view of a section of an L&S periodic pattern.

FIG. 1 is a schematic view of a section of an L&S periodic pattern. A substrate 1 has a material M1 and a material M2 arranged alternatively, whose refraction indexes are different from each other. It is known that a periodic structure like this has birefringence character and the character is called "form birefringence".

For example, if the material M1 is air and the material M2 is a resist, a measurement light 2 of a specific wavelength and a specific polarization is emitted to the periodic pattern formed by the materials M1 and M2 with a specific incident angle$\theta_1$. A condition of a reflected light 3, a composition of a reflected light 3a, which penetrates the material M2 (the resist), reflects on the surface of the substrate 1 and comes through the material M2 again, and a reflected light 3b which comes by reflecting on the surface of the material M2 is measured.

It is known that reflected light generally has a birefringence character when the interval of the periodic pattern is sufficiently smaller than the wavelength of the measurement light. This measurement can use a diffracted light produced when the interval of the periodic pattern is larger than the wavelength of the measurement light.

In FIG. 1:

a is the width of the material M2 (the resist), b is the width of the material M1 (the air), c is the interval of the periodic pattern (i.e., c=a+b), $n_a$ is a refraction index of the material M2, $n_b$ is a refraction index of the material M1, θ1 is an incident angle of the measurement light 2, h is a height of the materials M1 and M2, n1 is a refraction index of a surrounding material near an incident spot of the measurement light 2, and n3 is a refraction index of the substrate.

A laser beam with a wavelength of more than the interval c is supposed to enter into the periodic pattern shown in FIG. 1 perpendicularly. The incident light of a laser beam that has an electric field vector parallel to the pattern line (that lengthens perpendicularly to this paper's plane) is called an S polarized light. The incident light of the laser beam that has an electric field vector along the plate perpendicular to the pattern line is called a P polarized light. It is known that refraction indexes No and Ne at the periodic structure of the birefringence element (the periodic pattern) to the S polarized light and the P polarized light (S & P polarized lights) respectively are given by the following equations:

$$No^2 = (b/c) \cdot n_b^2 + (a/c) \cdot n_a^2 \quad (1)$$

$$Ne^2 = n_b^2 \cdot n_a^2 / [(b/c) \cdot n_a^2 + (a/c) \cdot n_b^2] \quad (2)$$

periodic pattern as an object to be measured shown in FIG. 1 is equivalent to a uniaxial optical crystal that has a refraction index No to the S polarized light and a refraction index Ne to the P polarized light. Therefore, a reflection coefficient rs to the S polarized light is approximately the same as the reflection coefficient of the thin film having the refraction index No, and a reflection coefficient rp to the P polarized light is approximately the same as the reflection coefficient of the thin film having the refraction index Ne. The reflection coefficients rs and rp are described in "Principles of Optics (Pergamon Press), M. Born and E. Wolf" and the detailed description will be omitted here.

According to the equations (1) and (2), and the equations concerning to the reflection coefficients rs and rp, the equivalent refraction indexes No and Ne of the periodic pattern change in accordance with the change of the duty ratio b/c of the periodic pattern. Because of that, the reflection coefficients rs and rp also change. That is, the duty ratio b/c of the periodic pattern influence the reflection coefficients rs and rp via the equivalent refraction indexes No and Ne. The phase condition of each polarized light decided in reflection on the periodic pattern will change in accordance with the change of the reflection coefficients rs and rp. Therefore, the duty ratio b/c will be known by measuring the intensity and phase shift of the reflection light from the periodic pattern.

Figure 2:
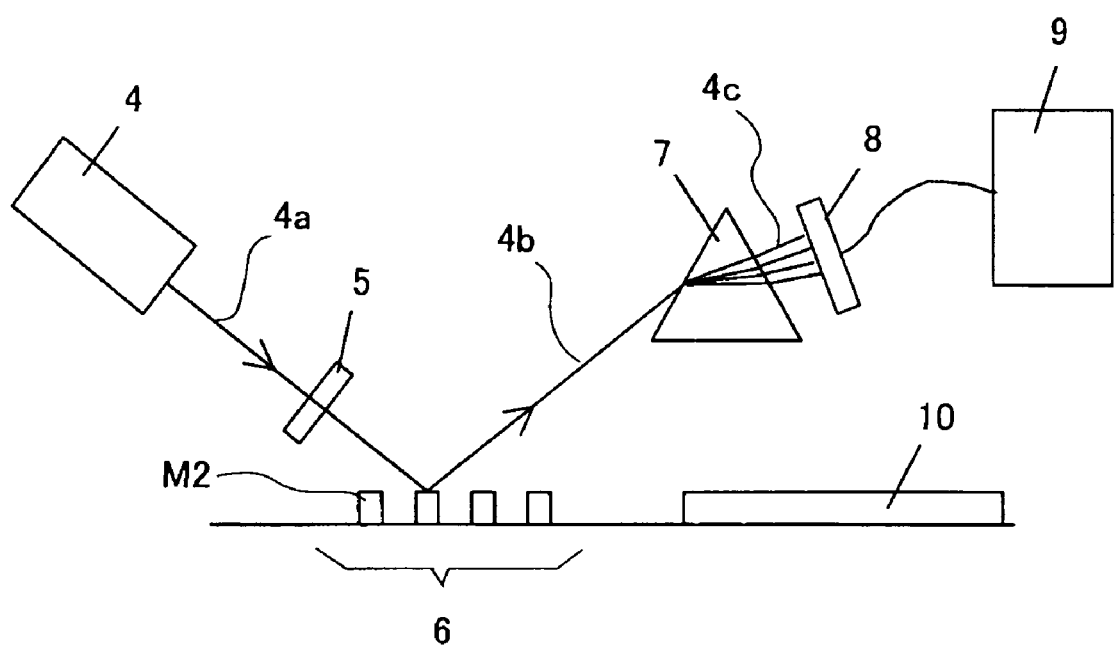
FIG. 2 shows an example of an optical system used in an apparatus for measuring the sectional shape of the periodic pattern that uses a spectroscopic ellipsometry method.

FIG. 2 shows an example of an optical system used in an apparatus for measuring the sectional shape of the periodic pattern, which uses a spectroscopic ellipsometry method. Polarization planes (the S & P polarized lights) and phases of an incident light 4a emitted from a light source 4 are adjusted and arranged uniformly by penetrating a rotatable polarizer 5 and the incident light 4a irradiates the periodic pattern 6. A reflection light 4b reflected on the periodic pattern 6 is separated spatially per wavelength by a spectroscopic optical system 7. A light sensor 8 that arrays photoelectric detectors detects the separated light 4c, the intensity ratio, and the phase shift of the S & P polarized lights of the separated light 4c per every wavelength, and transmits the information to a processor 9. The processor 9 calculates a sectional shape of the periodic pattern by comparing the information from the light sensor 5 and library information explained later, and outputs the results as the sectional shape of the periodic pattern 6 as the object to be measured.

This spectroscopic ellipsometry method described in FIG. 2 detects the condition of the reflection light 4b by emitting the incident light (broadband light) 4a that includes a plurality of wavelengths and fixing the incident angle. However, the spectroscopic ellipsometry method sometimes detects the same conditions (intensity ratio and phase shift) of the reflection light in some incident light conditions (incident angle or wavelength of incident light, etc.) despite of the difference of the resist thickness or difference of the resist pattern shape. Accordingly, the measurement accuracy will be improved by detecting the change of the reflection light in several incident conditions (several incident angles or several wavelengths of the incident light).

Figure 3:
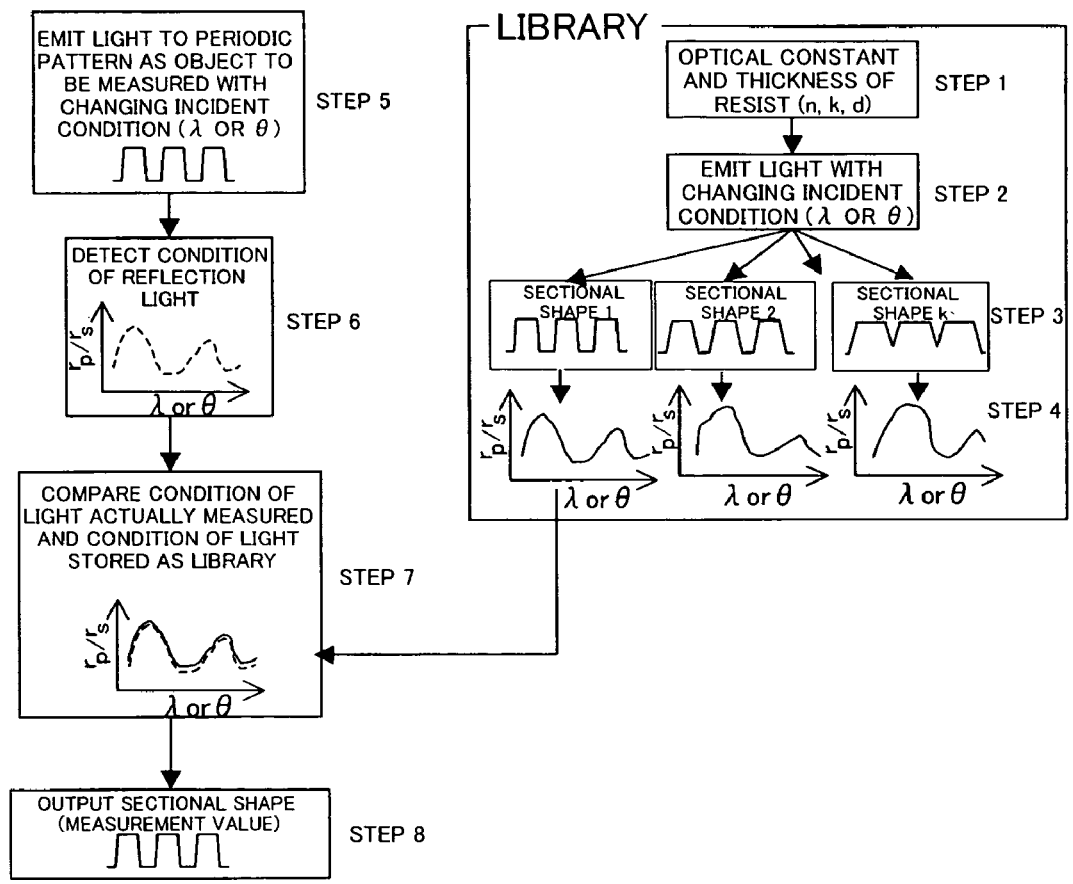
FIG. 3 is a flowchart explaining a conventional method for measuring the sectional shape of the periodic pattern as an object.

The previously mentioned measurement hardware manufacturers sell the apparatus for measuring the sectional shape using the spectroscopic ellipsometry method explained before as the apparatus for measuring CD (Critical Dimension, i.e., the line width of the periodic pattern) using a light. These apparatus can also measure the height or the sidewall angle of the periodic pattern besides the CD measurement. According to these measurement values, the sectional shape of the periodic pattern as the object is measured in accordance with the flowchart shown in FIG. 3.

As a preparation for the measurement, the possible sectional shapes of the periodic pattern are defined on the processor 9, and the processor 9 calculates the conditions of the reflection lights from each sectional shape and stores them as the library. That is, according to the optical constant (refraction index n, absorption coefficient k, and thickness d of material) of the material M2 (resist) which forms the periodic pattern 6 (STEP 1), the plurality of different incident conditions (plurality of incident angles, plurality of wavelength) of the incident lights (STEP 2), and the imaginable sectional shapes (STEP 3), the processor 9 calculates the information (change of the intensity ratio, phase shift) of the reflection lights that are the reflection of the incident lights on the imaginable sectional shapes (STEP 4).

After defining the plurality of different sectional shapes. (STEP 3) and calculating as explained above, the storage unit stores the calculated results and the corresponding sectional shapes with relation to each other in the form of a library. Here, the library means data or a database formed by the light's conditions which is obtained by calculation according to the optical constants and the periodic patterns, each having different sectional shapes related to the sectional shapes and optical constants corresponding to the light's conditions.

The optical constant of the periodic pattern used in STEP 1 needs to be different according to whether to use the incident angle or the wavelength of the incident light as parameters of the plural incident conditions. In measuring the reflection lights of different incident angles with one wavelength, the optical constant corresponding to the wavelength used in measurement is inputted to the processor. While, in measuring the reflection lights of different wavelengths with one fixed incident angle, the optical constants corresponding to the wavelengths used in the measurement have to be inputted respectively to the processor.

Next, the incident light $4a$ is emitted onto the periodic pattern 6 as an actual object to be measured (STEP 5), and the light sensor 8 detects the information of the reflection light (change of intensity, phase shift, etc)(STEP 6). By comparing the light information of the library stored in storage unit and the information of the reflection light $4b$ actually obtained from the detection, light information corresponding to the reflection light $4a$ will be obtained from the library (STEP 7). A sectional shape of the periodic pattern related to the light information among the plurality of the sectional shapes defined on the processor 9 is regarded as the sectional shape of the actual periodic pattern 6 (STEP 8).

The principle of the spectroscopic ellipsometry and the method for measuring the sectional shape using spectroscopic ellipsometry have been explained before. However, according to the process shown in FIG. 3, the measurement of the sectional shape will be inaccurate if the optical information in producing the library in STEP 1 to STEP 4 differs from the optical information of the actual object. For example, if the refraction index n, of the material M2 (resist), which actually forms the periodic pattern 6 becomes different from the refraction index n calculated in producing the library because of aged deterioration or difference among the lots of the material M2.

Figure 4:
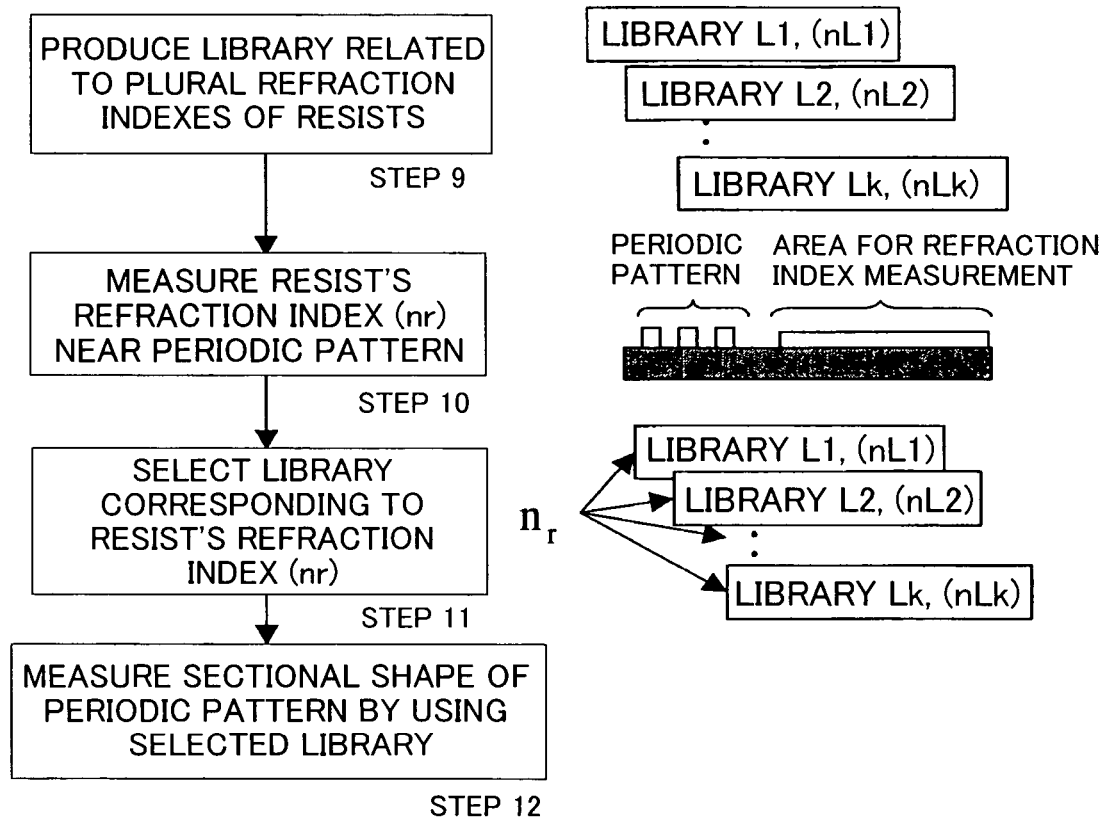
FIG. 4 is a flowchart explaining a method for measuring the sectional shape of the periodic pattern that uses the method for producing the library of the first embodiment according to the present invention.
Figure 5:
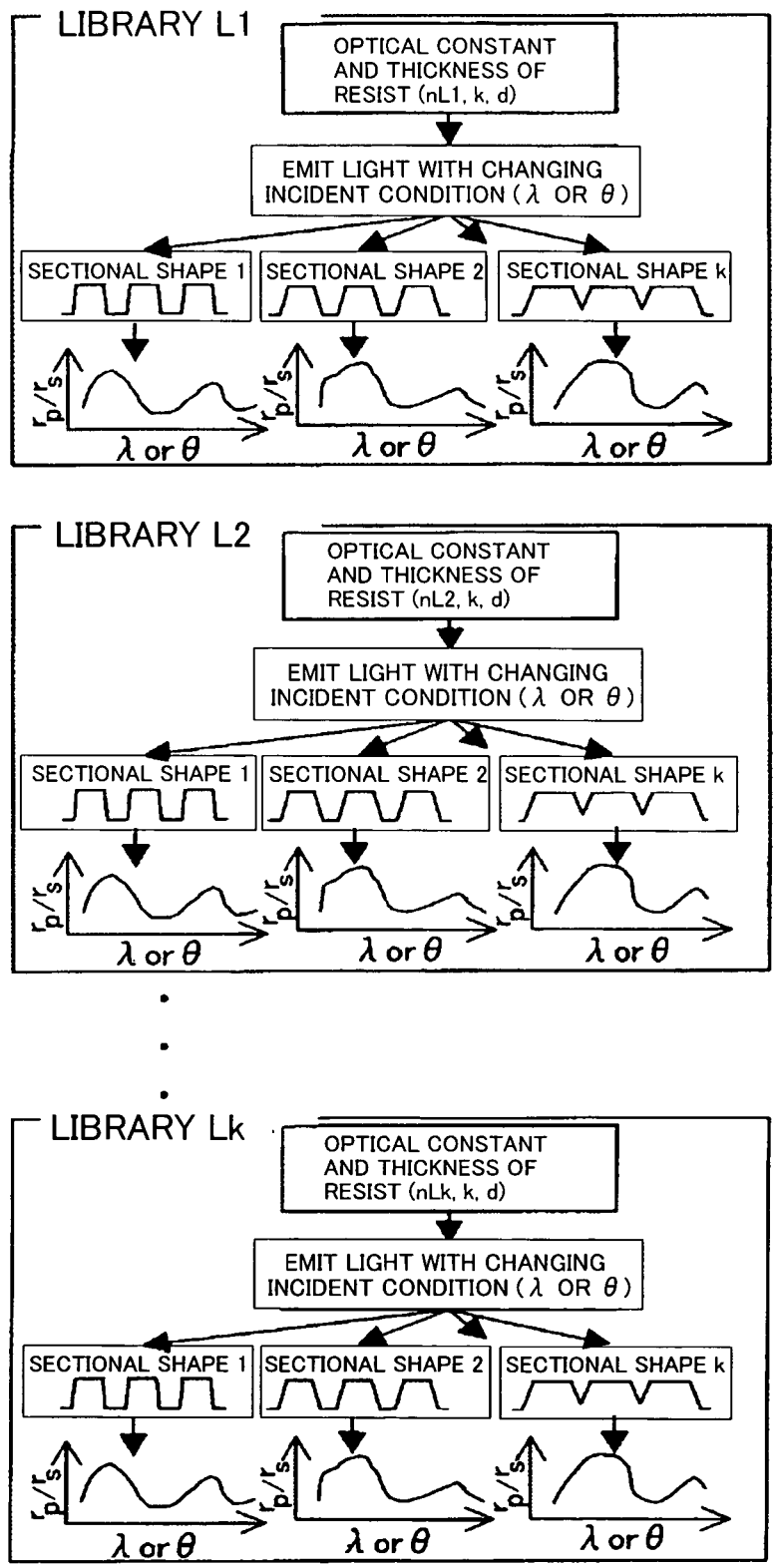
FIG. 5 is a schematic view of a library's structure produced by using the method for producing the library of the first embodiment according to the present invention.

Accordingly, the sectional shape will be measured in the processes shown in FIGS. 4 and 5. FIG. 4 is a flowchart explaining a method for measuring the sectional shape of the periodic pattern that uses the method for producing the library of the first embodiment according to the present invention. FIG. 5 is a schematic view of a library's structure produced by using the method for producing the library of the first embodiment according to the present invention. The first embodiment uses the resist as the material M2 which forms the periodic pattern 6 to be measured, and the description will be given in this embodiment of the case where the refraction index n only changes as the optical constant of the resist.

The condition of the reflection light $4d$ is calculated by changing the sectional shape 6, incident condition of the incident light $4a$, and the optical constant of the resist. Relating the light condition to the optical constant corresponding to the light condition produces a plurality of the libraries. Concretely, the library L1 is produced in the same processes of STEP 1 to STEP 4 shown in FIG. 3 in a condition that the refraction index of the resist is nL2 and the absorption coefficient of the resist is k. The library L2 is next produced in the same way where the refraction index of the resist is nL2 and the absorption coefficient of the resist is k. Thus, the libraries L1, L2, . . . , Lk which respectively correspond to the refraction indexes are produced by changing the refraction indexes nL1, nL2, . . . , nLk in turn and fixing the absorption coefficient k of the resist constantly (see FIG. 5). Here, the larger k as an integer is, the more the libraries are produced. Changing the range of the refraction index of the resist, i.e., the range of k is decided in a changing range of the resist's refraction index caused by aged deterioration or production lot dispersion of the resist.

Figure 6:
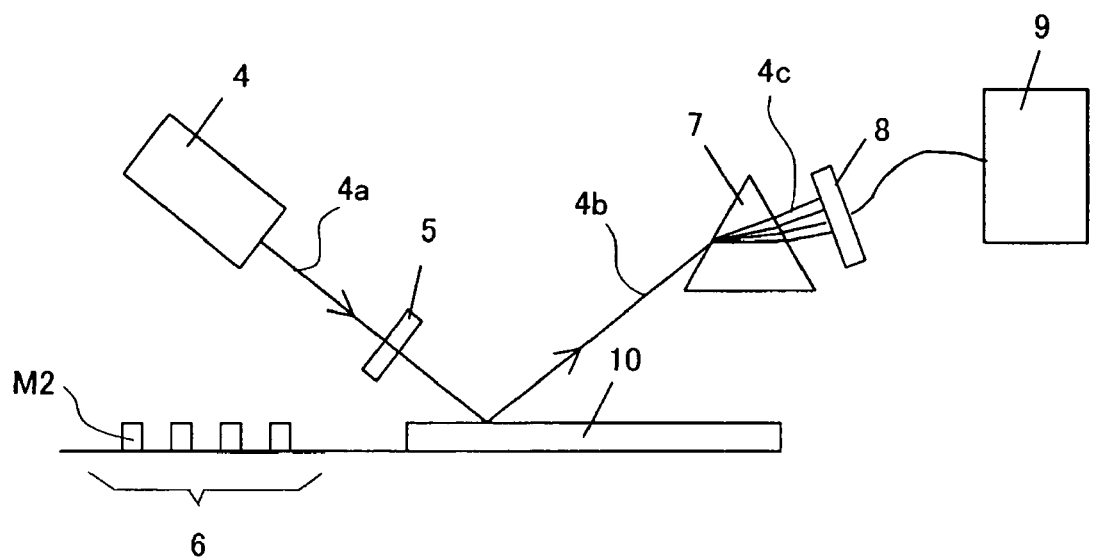
FIG. 6 is a schematic view showing a measurement of resist's refraction index by using a spectroscopic ellipsometer in the method for measuring the sectional shape of the periodic pattern that uses the method for producing the library of the first embodiment according to the present invention.

After producing the plural libraries L1, L2, . . . , Lk (STEP 9), as shown in FIG. 6, the spectroscopic ellipsometer measures the refraction index nr of the resist at a flat part 10 (see FIG. 6) near the periodic pattern 6 as the object whose sectional shape should actually be measured, wherein the periodic pattern 6 etc. is not formed at the flat part 10 (STEP 10). The incident light (broadband light) $4a$ from the light source, is emitted to the flat part 10 provided near the periodic pattern 6 via a rotatably adjustable polarizer 5. The reflection light $4b$ from the flat part 10 is detected by the light sensor 8 via the spectroscopic optical system 7, and the refraction index n of the resist at the flat part 10 is measured according to the light condition of the reflection light $4b$ as the detected result.

The measurement of the refraction index needs to be different according to whether to use the incident angle or the wavelength of the incident light as parameters of the plural incident conditions. In measuring the reflection lights $4b$ of different incident angles by using the incident lights $4a$ of one wavelength, the refraction index corresponding to the wavelength used in the measurement is measured. While, in measuring the reflection lights $4b$ of one fixed incident angle by using the incident lights $4a$ of different wavelengths, the refraction index respectively corresponding to the wavelengths used in measurement have to be measured.

Next, the library corresponding to the resist's refraction index nr measured in STEP 10 is selected from the plurality of the libraries produced in STEP 9 (STEP 11). That is, the library related to the refraction index nLk match up with the measured refraction index nr of the resist is selected from the plurality of the libraries. The sectional shape of the periodic pattern 6 is measured in the same way as STEPs 7 and 8 by using the selected library (STEP 12). Sensitivity of the resist's refraction index nLk to error of the sectional shape measurement is estimated in advance, tolerance (allowance of the agreement) $\alpha$ is decided, and the agreement of the resist's refraction index nr and the resist's refraction index nLk in producing the library including the tolerance $\alpha$, that is nLk±$\alpha$, is judged.

The first embodiment assumes the absorption coefficient k is constant because the change of the absorption coefficient k does not influence the calculation result. However, the library may be produced with the assumption that the refraction index n is constant and the absorption coefficient k changes, or both of the refraction index n and the absorption coefficient k change.

Figure 7:
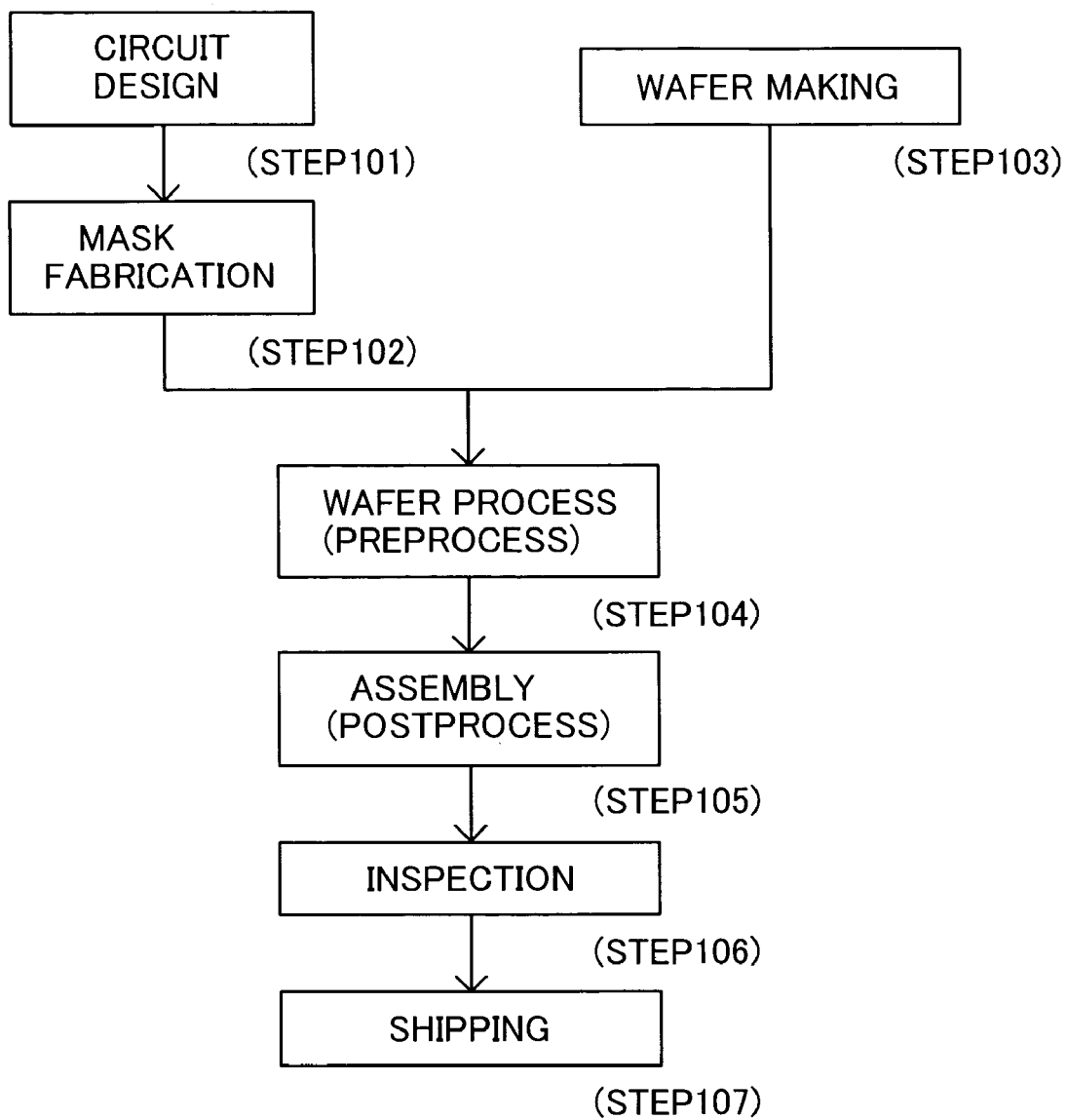
FIG. 7 is a flowchart explaining a method for fabricating a device including an exposure process exposed by an exposure apparatus that uses the method for producing the library of the first embodiment according to the present invention.
Figure 8:
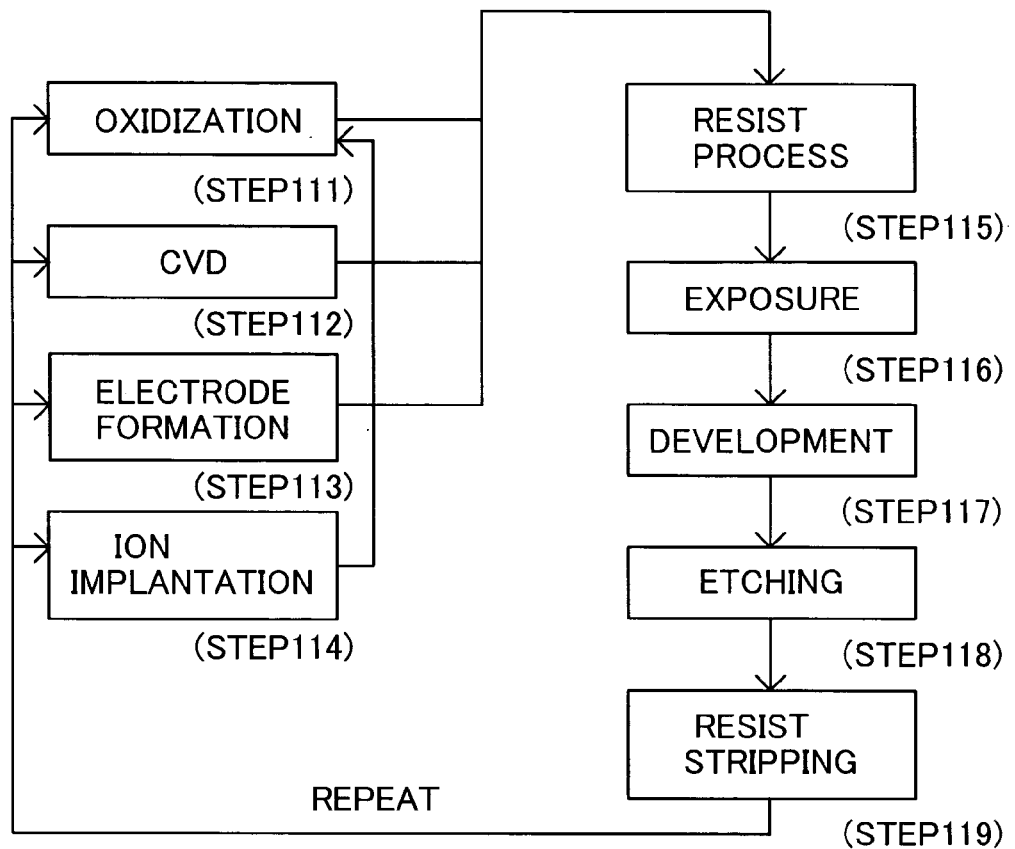
FIG. 8 is a detailed flowchart of step 104 of the wafer process shown in FIG. 7.

Referring now to FIGS. 7 and 8, a description will be given of an embodiment of a device fabricating method using the above exposure apparatus. FIG. 7 is a flowchart explaining fabrication of devices (i.e., semiconductor chips such as IC and LSI, LCDs, CCDs, etc.). Here, as an example, a description will be given of semiconductor chip fabrication. Step 101 (circuit design) designs a semiconductor device circuit. Step 102 (mask fabrication) forms a mask having a designed circuit pattern. Step 103 (wafer preparation) manufactures a wafer using materials such as silicon. Step 104 (wafer process), referred to as a pretreatment, uses the mask and wafer to form the actual circuitry on the wafer through photolithography. Step 105 (assembly), also referred to as a posttreatment, forms the wafer from Step 104 into a semiconductor chip and includes an assembly step (e.g., dicing, bonding), a packaging step (chip sealing), and the like. Step 106 (inspection) performs various tests on the semiconductor device made in Step 105, such as a validity test and a durability test. Through these steps, a semiconductor device is finished and shipped (Step 107).

FIG. 8 is a detailed flowchart of the wafer process in Step 104. Step 111 (oxidation) oxidizes the wafer's surface. Step 112 (CVD) forms an insulating film on the wafer's surface. Step 113 (electrode formation) forms electrodes on the wafer by vapor disposition and the like. Step 114 (ion implantation) implants ion into the wafer. Step 115 (resist process) applies a photosensitive material onto the wafer. Step 116

(exposure) uses the exposure apparatus to expose the circuit pattern on the mask onto the wafer. Step 117 (development) develops the exposed wafer. Step 118 (etching) etches parts other than the developed resist image. Step 119 (resist stripping) removes unused resist after etching. These steps are repeated to form multilayer circuit patterns on the wafer. The device fabrication method of this embodiment may manufacture higher quality devices than the conventional method. Accordingly, the device fabricating method and the devices as products are also within the scope of the present invention.

[The Second Embodiment]

A description of the second embodiment according to the present invention will be given next. If there is no library related to the resist's refraction index nLk corresponding to the resist's refraction index nr measured near the periodic pattern 6 in the plurality of the existing libraries, a new library datum of nr=nLk is produced by using the existing libraries. For example, the relationship between the resist's refraction index nr measured near the periodic pattern 6, a refraction index nL1 related to a library L1, and a refraction index nL2 related to a library L2 is supposed to be nL1<nr<nL2. In this case, by using optical information related to the library L1 and optical information related to the library L2, a library corresponding to the refraction indexes nLk=nr is newly produced by using interpolation, and is used for the actual measurement.

Though the method for producing a new library by a calculation that uses interpolation is explained in the second embodiment, a calculation that uses extrapolation may produce a new library by combining any other existing libraries. The method for countering the measurement error caused by the aged deterioration of the resist's refraction index or the dispersion among the production lots is explained in the first and second embodiments, and the change of the optical constant is not limited to the resist. If the periodic pattern 6 uses a material of non-resist (for example, Poly-Si, oxide film, BARC, etc.), use of an optical constant of the material as a parameter may produce a plurality of the libraries. The plurality of the libraries may be produced by changing an optical constant (refraction index n or absorption pattern k) of the foundation on which the periodic pattern 6 is formed, i.e. the substrate 1.

Further, the present invention is not limited to these preferred embodiments, and various variations and modifications may be made without departing from the scope of the present invention.

According to the present invention, by emitting the polarized light onto the periodic pattern, measuring the condition of the reflection light (intensity or phase) as a function of the incident condition (incident angle or wavelength), producing the plurality of libraries used in the measurement by the apparatus for measuring the sectional shape of the periodic pattern according to the change of the refraction index of the material which forms the periodic pattern, and selecting the library produced by using the refraction index appropriate for the measurement, a measurement with high throughput and high accuracy that is not influenced by the change of the optical constant of the material which forms the periodic pattern, can be achieved.

What is claimed is:

1. A method of measuring a sectional shape of a periodic pattern, said method comprising steps of:

simulating a condition of reflected lights from a periodic pattern to be obtained with respect to a plurality of conditions of an incident light to the periodic pattern, the condition of the reflected lights being simulated with respect to each of a plurality of sectional shapes of the periodic pattern and each of a plurality of optical constants of a material that forms the periodic pattern;

producing a library which relates the condition of the reflected lights to the sectional shape of the periodic pattern with respect to each of the plurality of optical constants;

measuring the optical constant of a material that forms an actual periodic pattern;

selecting a library corresponding to the measured optical constant from the produced plurality of libraries;

detecting a condition of reflected lights from the actual periodic pattern with respect to the plurality of conditions of an incident light to the actual periodic pattern; and obtaining a sectional shape of the actual periodic pattern based on the selected library and the detected condition of reflected lights.

2. A method according to claim 1, further comprising a step of producing a library corresponding to the measured optical constant by interpolation or extrapolation of the plurality of produced libraries if there is no library corresponding to the measured optical constant in the produced plurality of libraries.

3. A method according to claim 1, wherein the optical constant is at least one of a refraction index, an absorption coefficient, and a thickness of the periodic pattern.

4. A method according to claim 1, wherein the condition of reflected lights includes an intensity ratio of S and P polarized lights in a reflected light from the periodic pattern with respect to each of the plurality of conditions of the incident light.

5. A method according to claim 1, wherein the condition of the incident light is one of an incident angle and a wavelength of the incident light.

6. A method according to claim 1, wherein the material that forms the actual periodic pattern includes a resist.

7. An apparatus for measuring a sectional shape of a periodic pattern, said apparatus comprising:

a processor configured to simulate a condition of reflected lights from a periodic pattern to be obtained with respect to a plurality of conditions of an incident light to the periodic pattern, the condition of the reflected lights being simulated with respect to each of a plurality of sectional shapes of the periodic pattern and each of a plurality of optical constants of a material that forms the periodic pattern, and configured to produce a library which relates the condition of the reflected lights to the sectional shape of the periodic pattern with respect to each of the plurality of optical constants;

a storage configured to store a plurality of libraries produced by said processor; and an optical system configured to measure the optical constant of a material that forms an actual periodic pattern, and to detect a condition of reflected lights from the actual periodic pattern with respect to the plurality of conditions of an incident light to the actual periodic pattern, wherein said processor is configured to select a library corresponding to the measured optical constant from the produced plurality of libraries stored in said storage, and to obtain a sectional shape of the actual periodic pattern based on the selected library and the detected condition of reflected lights.

8. An exposure apparatus which comprises a projection optical system configured to project a pattern of a reticle onto a substrate, and exposes the substrate to light via the reticle and said projection optical system, said apparatus further comprising means for:

simulating a condition of reflected lights from a periodic pattern on the substrate to be obtained with respect to a plurality of conditions of an incident light to the periodic pattern, the condition of the reflected lights being simulated with respect to each of a plurality of sectional shapes of the periodic pattern and each of a plurality of optical constants of a material that forms the periodic pattern;

producing a library which relates the condition of the reflected lights to the sectional shape of the periodic pattern with respect to each of the plurality of optical constants;

measuring the optical constant of a material that forms an actual periodic pattern formed on the substrate;

selecting a library corresponding to the measured optical constant from the produced plurality of libraries;

detecting a condition of reflected lights from the actual periodic pattern with respect to the plurality of conditions of an incident light to the actual periodic pattern; and obtaining a sectional shape of the actual periodic pattern based on the selected library and the detected condition of reflected lights.

9. A method of fabricating a device, said method comprising steps of:

exposing a substrate to light via a reticle using an exposure apparatus as defined in claim 8;

developing the exposed substrate; and processing the developed substrate to fabricate the device.

* * * * *